Dec. 16, 1941.     J. F. HAGERTY     2,266,635
CHOCOLATE COATING ICE CREAM BARS
Filed Oct. 19, 1939     4 Sheets-Sheet 1
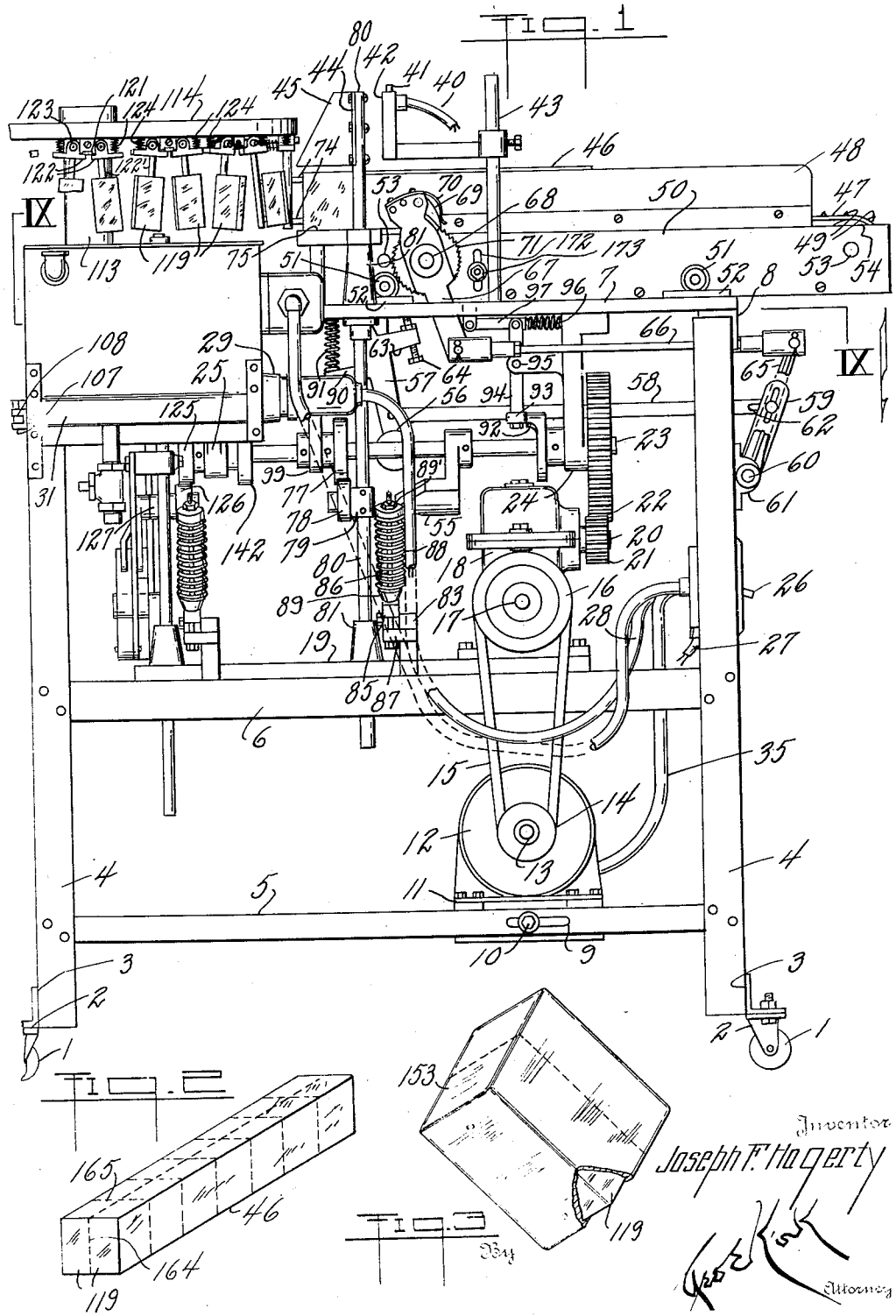

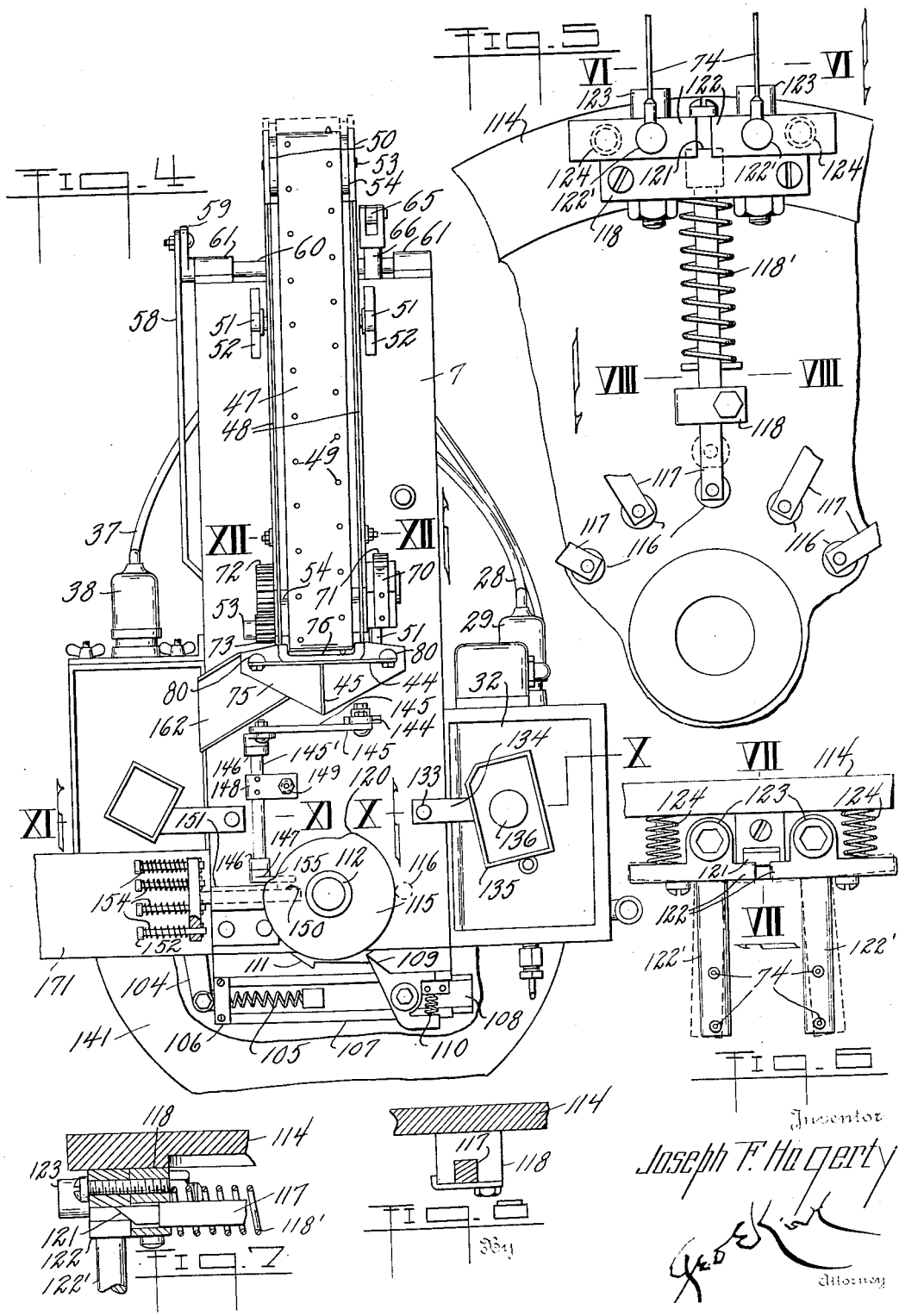

Dec. 16, 1941.    J. F. HAGERTY    2,266,635
CHOCOLATE COATING ICE CREAM BARS
Filed Oct. 19, 1939    4 Sheets-Sheet 3
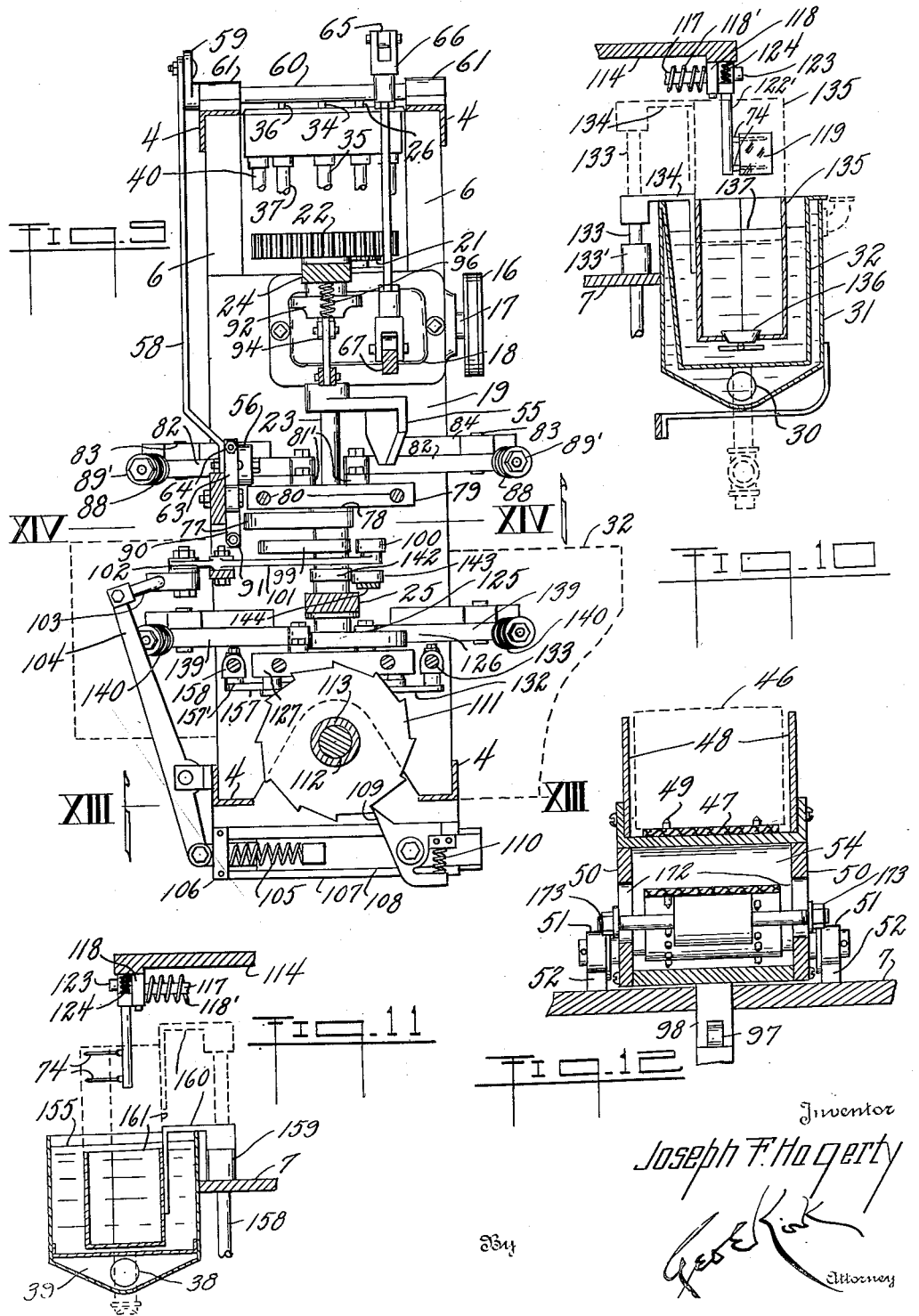
Inventor
Joseph F. Hagerty
By
Attorney

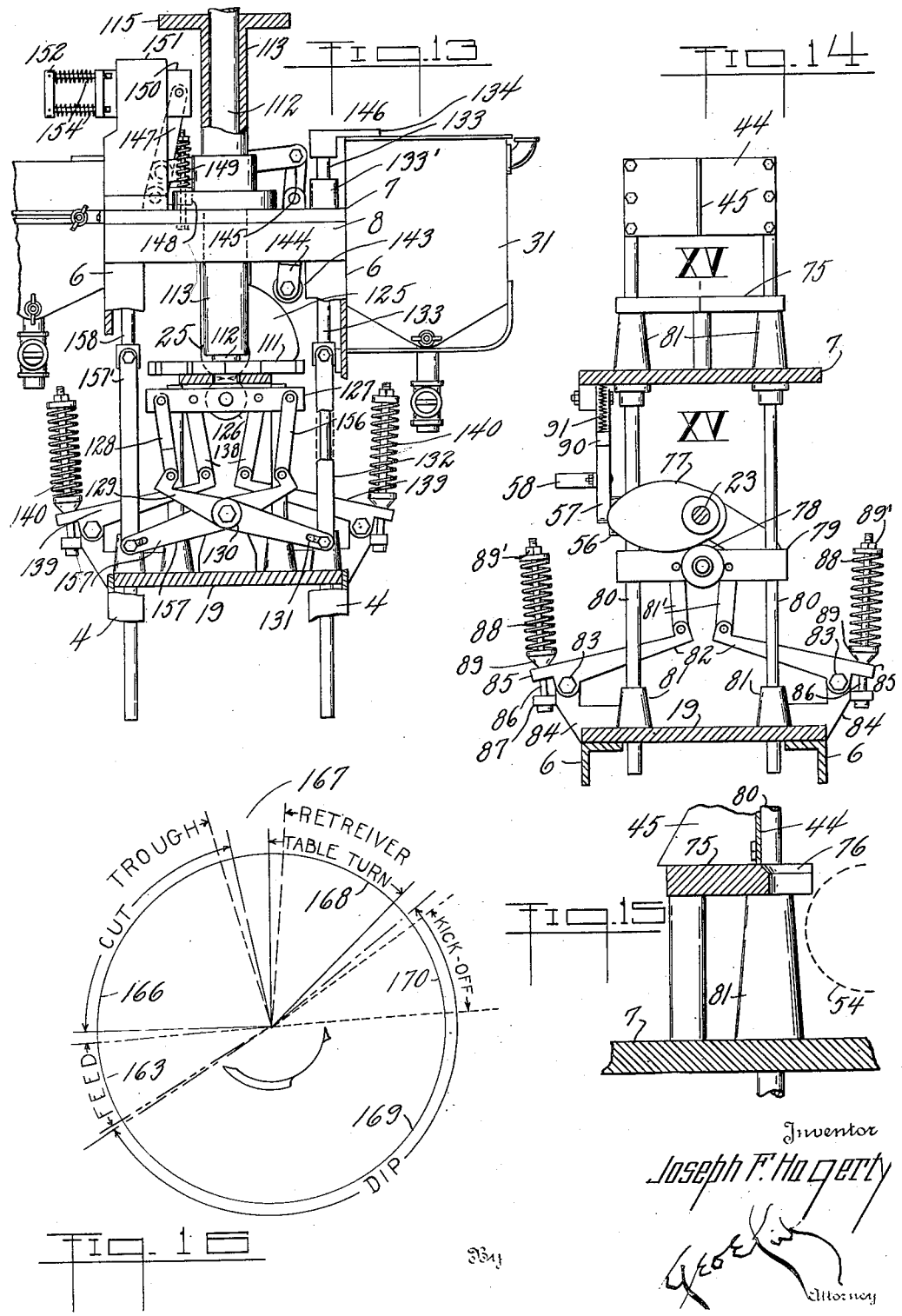

Patented Dec. 16, 1941

2,266,635

UNITED STATES PATENT OFFICE 2,266,635

CHOCOLATE COATING ICE CREAM BARS

Joseph F. Hagerty, Fremont, Ohio

Application October 19, 1939, Serial No. 300,121

8 Claims. (Cl. 91—14)

This invention relates to the severing and coating of sections of material.

This invention has utility when incorporated in cutting fragments or defined sections from ice cream, even in multiple, and coating as with chocolate.

Referring to the drawings:

Fig. 1 is a side elevation of the invention in an ice cream bar machine for coating such with chocolate;

Fig. 2 is a perspective view of a block of the ice cream as supplied to the machine of Fig. 1, with indication in dotted lines of the subdivision therefor;

Fig. 3 is a perspective view of a chocolate coated ice cream service portion or bar, a portion being broken away to show the coating; while the dotted lines indicate range of dimension variation with the machine of Fig. 1;

Fig. 4 is a plan view of the machine of Fig. 1, the supply belt being without ice cream block thereon, and the turn table or carrier for the coating sequence, being removed;

Fig. 5 is a fragmentary bottom plan of the carrier as to the mounting pins and spreader device therefor;

Fig. 6 is a view on the line VI—VI, Fig. 5, of the ice cream mounting and spreader for an ice cream bar pair;

Fig. 7 is a section on the line VII—VII, Fig. 6, showing the spreader cam for the ice cream bar mounting pins;

Fig. 8 is a section on the line VIII—VIII, Fig. 5, showing the guide holder to maintain the spreader cam from rocking;

Fig. 9 is a section on the line IX—IX, Fig. 1, showing the main drive shaft and the various drives therefrom;

Fig. 10 is a section on the line X—X, Fig. 4, showing the molten chocolate reservoir and lifting cup, the dotted lines disclosing dip position taken by the cup to immerse pin-carried ice cream bar pair;

Fig. 11 is a section on the line XI—XI, Fig. 4, showing the hot oil immerser or defroster for the ice cream bar mounting pins, as such pins have been cleared of the coated pair of ice cream bars;

Fig. 12 is a section on the line XII—XII, Fig. 4, being across the supply way, and disclosing the tightener for the ice cream block conveyor belt;

Fig. 13 is a view partially on the line XIII—XIII, Fig. 9, additional parts being broken away, more particularly for showing the operating parts for the cup lifter in coating and the pin defroster;

Fig. 14 is a section on the line XIV—XIV, Fig. 9, showing the control cam for bringing down the T-shaped severing blade or knife, effective for simultaneously cutting, from the block, a pair of service sections of ice cream;

Fig. 15 is a section on the line XV—XV, Fig. 14, showing the clearance space or bevel of the receiving table or plate for the pair of ice cream sections impaled on the pins as the block is projected along the supply way by the conveyor belt, this bevel clearance being increased toward the belt as such is retracted at the cutting position for the knife; and Fig. 16 is a diagram in circular or polar sequence of the operations as occurring in the functioning of the ice cream bar coating machine hereunder.

Casters 1 have swivel mounting 2 with angle bars 3 (Fig. 1) from which uprights 4 of the frame extend in providing legs mounting cross bars 5, 6, deck 7, and end bars 8. Bar 5 has slot 9 through which bolt 10 extends to provide clamp mounting for base 11. The base 11 is thereby adjustable as to the frame in locating motor 12, having shaft 13 carrying a pulley 14 about which extends a V-belt 15 which reaches upward about pulley 16 on shaft 17 extending into worm gear speed reduction housing 18, on frame 19 carried by bars 6 of the frame. The motor adjustment 9, 10, permits tightening desired for the belt 15.

From the speed reduction housing 18 projects a shaft 20 with which is fixed a pinion 21 in mesh with a gear 22 fixed with a shaft 23 carried by bearings 24, 25, depending from the deck 7 of the frame. This horizontally extending shaft 23 lengthwise below the top of the frame has therefrom various control connections for sequence of operations hereunder.

It is in order that the operator throw in a switch 26, thereby connecting electric power supply lines 27 as power supply by way of conduit 28 for electric heater 29 having heat emitting portion 30 (Fig. 10) in outer chamber or jacket 31 for hot chocolate reservoir 32.

On the frame adjacent the switch 26, is a switch 34 (Fig. 9) for cutting in an electric power supply by way of conduit 35 to the motor 12.

A third switch 36, in the bank with the switches 26, 34, is effective, as thrown, to have the electric current effective through a conduit 37 for acting at an electric heater device 38 (Fig. 11) in a chamber 39 for the hot oil reservoir.

Additional electric current connection from the supply panel grouping of the switches is by way of conduit 40 to switch 41 at electric heater or warming device 42 mounted on post 43 rising from the frame and adjacent blade 44, 45. At the lifted position for the blades, there is such proximity to this device 42 that the temperature of the blades may be such as not to adhere to the ice cream or frozen confection being handled.

A block 46 of congealed material (Fig. 2), is placed on belt 47 (Fig. 1) between parallel side walls or guides 48. The belt 47 has minor prongs or flights 49 insuring that the block 46 may travel therewith and that the overhanging projecting portion at the delivery end may be definitely thrust therefrom. Carrying the guides 48 is the belt mounting housing having side walls 50 with rollers 51 on short tracks 52 at the top of the frame. Shafts 53 through the belt housing mount pulleys 54 about which the belt 47 extends.

The belt drive

On the shaft 23 is a cam 55 which acts on a roller 56 carried by a lever 57 hanging from the upper portion of the frame. This rocking of the lever 57 is effective through a link 58 to act upon an adjustable length arm 59 mounted on a rock shaft 60 at bearings 61 across the end of the frame. A slot 62 is in the link 58. A connecting bolt therefrom to the arm 59 may be adjusted to vary the distance or time the travel of the belt 47 from the intermittent grip device. Furthermore, an arm 63 of the lever 57 carries adjusting screw 64. The position of this screw is an additional factor in determining the feed travel effective from the cam 55. Fixed with the rock shaft 60 is an upstanding arm 65 from which extends a link 66 to lever 67 of an intermittent grip device. The lever 67 is fulcrumed on a shaft 68 carried by the belt housing side walls 50. A ratchet pawl 69 is mounted on the lever 67 and is normally held by a spring 70 in mesh with a ratchet gear 71 fast on the shaft 68 as to which the lever 67 is loose. The shaft 68 as extending through the housing carries gear 72 (Fig. 4) in mesh with a pinion 73 on one of the shafts 53. Accordingly the upper reach of the belt 47 is given a step by step feed in progressing a block of material to ride therefrom and be impinged upon pins 74 above receiving table 75 having bevel edge 76 (Figs. 4, 15) toward the belt.

The cutter operation

A cam 77 (Fig. 1) on the shaft 23, rides against a roll 78 (Fig. 14) mounted on a block 79 fixed with upright pair of rods 80 slidable in guides 81 mounted in the frame. The blade 44, 45, is fixed with the upper terminal portions of the rods 80.

The roller 78 is held against the cam 77 through the thrusting of links 81' from the levers 82 mounted in bearings 83 of brackets 84 carried by the frame. These respective levers 82 remote from the links 81', have an eye-carrying short arm 85 through which extend rods 86 from fixed brackets 87. Upon the rods 86 are compression helical springs 88 having thrust heads 89 at the arms 85. Nuts 89' may adjust the compression and thereby the holding action of the block 79 as to the cam 77.

In the belt drive, the lever 57, opposite from the arm or projection 63, has projection 90 acted upon by compression helical spring 91 (Fig. 1), thus normally at all times to hold the roller 56 toward the cam 55.

Retrieving the supply at cutting operation

When the knife 44, 45, is down in severing effecting position as to the block 46, a cam 92 on the shaft 23, rides against a roller 93 on a lever 94 having a fulcrum 95 in a bracket extension from the bearing 24. A spring 96 acts on the lever 94 to hold the roller 93 toward the cam 92. From the lever 94 remote from the roller 93, there extends a link 97 having a connection 98 with the supply belt housing 50. The timing of this device is such that, when the knife 44, 45, is at the table 75, the belt housing pulls away from the knife and in so doing pulls back the block 46 thereon for the block is held with the belt 47 by the prongs or flights 49. This means a clear cutting off is effected by the knife 44, 45, with a clearance of the block 46 as to the knife as such knife ascends and leaves the pins 74 with a pair of service sections from the block impinged on the pins and above the table 75.

Spreading of service section pair

On the shaft 23 is a cam 99 (Figs. 1, 9) to act upon a roller 100 carried by a lever 101, mounted in a fulcrum 102 fixed with the frame. In the transmission system from the bell crank lever 101, a link 103, a lever 104, act upon a compression spring 105 to hold the roller 100 toward the cam 99.

The spring 105 acts against a stop 106 fixed with the frame. About the spring 105 and pivotally connected to be shifted in a guide or slide way 107 fixed with the frame, is a bar 108 which has mounted thereon a pawl 109, normally thrown by a spring 110 into meshing engagement with a ratchet 111 fixed with a shaft 112. A bearing sleeve 113 (Fig. 9) encircles the shaft 112. Near one end of this sleeve is located the ratchet 111, and near the other end thereof, is a carrier or rotary table 114. The sleeve 113 is fixed with the frame.

Fixed with the frame and sleeve 113 adjacent the under side of the carrier 114 is a cam 115 engaged by rollers 116 (Figs. 4, 5, 6, 7, 8). The rollers 116 are mounted on slide bars 117, radially directed in guides 118 fixed with the carrier 114. Springs 118' act on the bars 117 to thrust the rollers 116 toward the cam 115. As the carrier 114 is shifted to move pins 74 away from the receiving station where a pair of sections 119 of congealed material is impinged one adjacent the other, the cam 115 has its section 120 act to thrust the slide bar 117 in such progress radially outward, with its terminal wedge 121 acting upon arms 122 having depending rods 122' mounting the pins 74. A pivot pin 123 is located one on each side of the wedge 121 and serves as a fulcrum for the respective arms 122 thereon to be swung away from its companion arm. Thereby, the pair of pins 74 on such arm spreads its impinged service portion or section 119 away from its companion section, to provide a degree of clearance therebetween. This outward swinging action of the depending arms 122' is against springs 124.

Coating

The carrier drive, during which the spreading operation has taken place, brings the suspended pair of service portions 119 to the next station from the receiving station, or to the position to be coated, above the hot chocolate reservoir 32.

The shaft 23 has thereon a cam 125 (Figs. 1, 13) to act upon a roller 126 mounted in a crosshead 127 from which depends a link 128 to a lever 129 in a bearing 130 fixed with the frame. The lever 129 has a slot connection 131 with an upwardly directed link 132 to a slide 133.

The upper portion of the slide 133 has an arm 134 to mount (Fig. 10) a cup 135 having in its bottom a check valve 136 effective upon descent into the liquid bath of immersing substance, such as hot chocolate 137 in the reservoir 32, to bring up a quantity thereof upon the lifting of this cup. Such lifting of the cup 135 is at the coating station and is to such an extent that the pin impinged pair of spread service portions 119 are fully immersed. This occurs at this station of rest in the intermittent progress of the carrier 114. Simultaneously, there is occurring at the delivery station, a repetition of supply operation for an additional or subsequent pair of service portions to be severed from the supply block and mounted on the pins 74.

The roller 126 is held against the cam 125 (Fig. 13) through links 138, levers 139, and springs 140, similar to the assembly from the links 81 and the springs 88.

Congealing

In practice, especially in such coating, as ice cream service portions with hot chocolate, it is in order to provide a time interval for the chocolate coating to set. Accordingly herein several steps are allowed for such timing in the transit toward a succeeding operation. Below the suspended chocolate coated pair of bars on such journey is located a pan 141 to conserve any excess which may drip therefrom. As such accumulates, the pan 141 may be emptied into the reservoir 32.

Kick-off

A cam 142 on the shaft 23 contacts a roller 143 (Figs. 1, 4, 9, 13) on an arm 144 connected to a link 145 extending to a rockshaft 145' in bearings 146 of the frame. Fixed with the rock shaft 145' are arms 147, 148. The arm 148 through a spring 149 holds the roller 143 against the cam 142. The arm 147 reciprocates a slide 150 mounted in a guide 151 fixed with the frame. The slide 150 has a head 152 which is thrust at the kick-off station against the chocolate coated service pair of portions 153. This discharge is effected against the resistance of springs 154 at the head 152.

Defrosting the cleared pins

With the coated service portion pair 153 discharged, the pins 74 should be clear of any adhering chocolate or ice cream. For this washing, cleaning or defrosting operation, so that as the pins are again at the delivery station, it has been found helpful to immerse the pins 74 in a bath, as of a hot oil 155 in the vessel or chamber 39 (Figs. 4, 11, 13). To this end, the transmission connection effecting the coating operation at a period of rest following the supply or delivery station, in advance of such delivery station, at a region 155' of the cam retracts the spreading of the pins 74. The crosshead 127, has, through a link 156 and a lever 157, a link 157', an actuation connection to a slide 158 and a guide 159 therefor, in similar set up to the chocolate dipper cup 135. However, on this the opposite side of the frame, the slide 158 is to an overhanging arm 160 effective to lift a cup 161 from the reservoir or chamber 39. In such lifting, a volume of the hot oil from the portion 155, is brought to position to immerse the pins 74. Any adhering or coating material is thereby melted off the pins which, as the cup 161 descends, are in position for travel to the delivery receiving station. A chute 162 is in position to direct any dripping oil from the pins 74 or the arms 122', back to the vessel 39.

The carrier has accordingly been traced through a complete cycle of operations, which as shown is step-by-step, with such sequence that at each station an operation is taking place under normal functioning.

The timing

More briefly, feeding interval 163 (Fig. 16) is of a block 46, before there be any severance as shown by dotted lines 164, 165 (Fig. 2). A succeeding interval is that of cutting 166 (Fig. 16), when the blade 44, 45, effects severance of a pair of service portions 119 from the block 46. Retrieving operation 167 of the belt 47 from the table 75 occurs more or less overlapping such with an interval 168 of shifting of the carrier 114 to its next stop.

It is proper to consider the timing as within the interval of rotation of the shaft 23 (Fig. 14) for the respective cycles. An interval 169 (Fig. 16) for dipping due to the cam 125 may be effective for coating at the cup 135 (Fig. 10). Simultaneously at the remote station, the cup 161 (Fig. 11) clears the pins 74 at the opposite side of the carrier 114 from adhering material. Such clearing of the pins is at station following the kick-off 170 from cam 142 at which the congealed coated service portions are thrust clear of the machine to land on a receiver or table 171, to be given a wrapping, packing or such other attention as may be in order. The period of collapse or proximity for the pins 74 is at the region 155' due to the cam 115 from defrosting to past receiving a pair of sections as impinged thereupon by the thrusting action from the belt 47. The balance of the travel of the carrier has the cam 115 effective as to its larger diameter portion 120 to hold the pins 74 in service portion pair spreading relation.

The disclosure is of handling bulk material from definite form quantity, say as to cross section, regardless of length. The handling is for subdivision in a plurality of directions, herein shown as at least two portions adjacent and extending away from the bulk residue. While specially adapted to ice cream, the commodity may be other edible, or even non-edible substance, susceptible to severance. The severed sections are herein handled to be coated. Such applied substance is herein shown as dissimilar to the body 46 for congealing as a jacket on this body. The bath for ready envelope effect is shown as of liquid instead of other state. For edibles, coating may be of the range of frostings, color effects, syrups for favor, but for non-edibles there may be pigment carriers with or without pigment. Defrosting of the pins means to bring a cleanser thereto, and in lieu of vapor blast, water, or possible taste-imparting substance (not desired for edible product), warmed oil may be used which is tasteless and efficient at the normal speed in operation of the machine.

Slots 172 (Figs. 1, 12) for bolts 173 provide belt tightener adjustment means for the conveyer belt 47.

What is claimed and it is desired to secure by United States Letters Patent is:

1. Apparatus for subdividing a supply block comprising a supply way for the block, a cutter transversely of the terminus of the way, a carrier adjacent the cutter, and a drive device including step-by-step progressing means for the block as to the supply, cutter actuating means for severing a section from the block between the step intervals of the block progress, registering shifting means for the carrier having receiving pins upon which the progressed block impinges as progressed past the cutter, said pins as entering the block being clear of the cutter, said carrier having a bath station to which the pin-mounted severed section is progressed, a reservoir at the bath station, and means for elevating said reservoir to coat the pin-mounted section during an interval of rest for the carrier.

2. Apparatus for subdividing a supply block comprising a supply way for the block, a cutter transversely of the terminus of the way, a carrier adjacent the cutter, and a drive device including step-by-step progressing means for the block as to the supply, cutter actuating means for severing a section from the block between the step intervals of the block progress, registering shifting means for the carrier having receiving pins upon which the progressed block impinges as progressed past the cutter, said pins as entering the block being clear of the cutter, said carrier having a bath station to which the pin-mounted severed section is progressed, a reservoir at the bath station, means for elevating said reservoir to coat the pin-mounted section during an interval of rest for the carrier, said carrier having a period of timing space from the bath station for congealing the coating, a kick-off station, and means for shifting the pin-supported coated section clear of the carrier.

3. Apparatus for subdividing a supply block comprising a supply way for the block, a cutter transversely of the terminus of the way, a carrier adjacent the cutter, and a drive device including step-by-step progressing means for the block as to the supply, cutter actuating means for severing a section from the block between the step intervals of the block progress, registering shifting means for the carrier having receiving pins upon which the progressed block impinges as progressed past the cutter, said pins as entering the block being clear of the cutter, said carrier having a bath station to which the pin-mounted severed section is progressed, a reservoir at the bath station, means for elevating said reservoir to coat the pin-mounted section during an interval of rest for the carrier, said carrier having a period of timing space from the bath station for congealing the coating, a kick-off station, means for there shifting the pin-supported coated section clear of the carrier, and a defroster for the carrier pin as cleared of the coated section.

4. Apparatus for subdividing a supply block comprising a supply way for the block, a cutter transversely of the terminus of the way, a carrier adjacent the cutter, said carrier having a charge-receiving station for the cut section, a coating station, a congealing interval for the coating, a kick-off station, a defroster for section sustaining pins on the carrier, and drive means for controlling progress in sequence of a section from the block to the kick-off.

5. Ice cream bar manufacturing apparatus comprising a knife device for simultaneously cutting an adjacent pair of sections from a supply block, engaging means receiving the section pair, a spacer for the engaging means to effect spreading therebetween, a chocolate bath, elevating means for the bath to submerge and coat the spread sections, a carrier for the engaging means to progress the sections in a time interval for congealing of the coating thereon, and discharge means for delivering the coated pair of sections from the apparatus.

6. Foodstuff service portion manufacture comprising progressing a block, severing sections from the block, retracting the block from the severed sections, continuing the travel of the severed sections in approximating horizontal course from the block, enveloping said removed sections with a coating material, and then discharging the coated sections.

7. Foodstuff service portion manufacture comprising progressing a block, simultaneously severing a plurality of sections from the block, retracting the block from the severed sections, continuing the travel of the severed sections in approximating a horizontal course from the block, and during said travel establishing clearance between the group of sections as simultaneously removed from the block, enveloping the group of the severed sections with coating material, and then discharging the group of the coated sections.

8. Foodstuff service portion manufacturing apparatus comprising feeding means for progressing a block of foodstuff, impinging means for the block terminus, a support for the block adjacent the impinging means, severing means for removing from the block terminus impinged portions of the blocks as sections to be supported by the impinging means, a retractor means acting on the support counter to the progress of the block as effected by the feeding means, said support as retracted leaving the impinged and severed portions sustained by the impinging means, lifting means for projecting a bath of coating material to envelop the impinged and thereby carried sections, sequence control means timing the coated sections for congealing of the coating thereon, and discharge means for delivering the coated sections from the apparatus.

JOSEPH F. HAGERTY.